(12) United States Patent
Fujii et al.

(10) Patent No.: US 6,327,853 B1
(45) Date of Patent: Dec. 11, 2001

(54) STRUCTURE FOR INTRODUCING SECONDARY AIR INTO EXHAUST PATH OF INTERNAL COMBUSTION ENGINE

(75) Inventors: Noriaki Fujii; Kouta Yoshiura, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,147

(22) Filed: Aug. 31, 1999

(30) Foreign Application Priority Data

Sep. 2, 1998 (JP) .................................................. 10-248837

(51) Int. Cl.[7] ...................................................... F01N 3/10
(52) U.S. Cl. ................... 60/304; 60/289; 60/293; 123/41.82 R
(58) Field of Search .............................. 60/289, 290, 291, 60/292, 293, 304, 305, 307; 123/193.5, 41.82 R, 41.72

(56) References Cited

U.S. PATENT DOCUMENTS

| | | | |
|---|---|---|---|
| 3,537,257 | * 11/1970 | Webster et al. | ......................... 60/293 |
| 4,387,565 | * 6/1983 | Otani et al. | ............................. 60/293 |
| 4,430,857 | * 2/1984 | Ikenoya et al. | ......................... 60/274 |
| 4,434,615 | * 3/1984 | Ikenoya et al. | ......................... 60/293 |
| 4,539,812 | * 9/1985 | Rezy | ..................................... 60/304 |
| 4,558,670 | * 12/1985 | Trihey | ................................. 123/308 |
| 5,657,628 | * 8/1997 | Takeuchi | ............................... 60/293 |
| 5,761,904 | * 6/1998 | Nakayama | ............................ 60/293 |
| 6,085,519 | * 7/2000 | Prior et al. | ............................. 60/304 |

* cited by examiner

Primary Examiner—Thomas Denion
Assistant Examiner—Binh Tran
(74) Attorney, Agent, or Firm—Armstrong, Westerman, Hattori, McLeland & Naughton, LLP

(57) ABSTRACT

A secondary air introducing path 23 is formed in a cylinder head 1 along an exhaust port 5. Secondary air is fed by an air pump with pressure, and an outlet 23a of the secondary air introducing path 23 is formed so that a blowing direction of the outlet 23a is directed to an exhaust valve 7 side. There is provided a water jacket 22 between the secondary air introducing port 23 and an upper portion of the cylinder head 1.

3 Claims, 2 Drawing Sheets

STRUCTURE FOR INTRODUCING SECONDARY AIR INTO EXHAUST PATH OF INTERNAL COMBUSTION ENGINE

BACKGROUND OF THE INVENTION

1. Field of the Invention

The present invention relates to a structure for introducing secondary air into an exhaust path of an internal combustion engine. More particularly, the present invention relates to a structure for introducing secondary air into an exhaust path of an internal combustion engine by which the preheating effect of introduced secondary air is improved and the re-combustion property of exhaust gas is enhanced.

2. Description of the Related Art

Conventionally, it is well-known that secondary air is introduced into an exhaust path of an internal combustion engine and re-combusted in the exhaust path, so that HC and CO contained in exhaust gas, which are unburned components, are reduced. In this case, at a position where the temperature of the exhaust gas is high, re-combustion of exhaust gas is more effectively carried out. Therefore, the secondary air is introduced into a portion of the exhaust path which is located as close to an exhaust port as possible.

In the secondary air introducing structure from which secondary air is introduced into the exhaust path of the internal combustion engine shown in FIG. 2, there is formed an exhaust path 105 in a cylinder section 100 composed of a cylinder block 102 and a cylinder head 101. In the periphery of the exhaust path 105, there are formed water jackets 119, 120, 121, and secondary air is introduced into the exhaust path 105.

The water jacket 120 is formed by a water jacket cover 130 attached to an outer face of the cylinder section 100. Outside the water jacket cover 130, there is provided a valve cover 131. By the water jacket cover 130 and the valve cover 131, a valve chamber 132 is formed. In the valve chamber 132, there is provided a valve 133.

In the water jacket cover 130, there is formed an opening 134. In the cylinder section 100, there is formed a communicating path 135 which is communicated with the opening 134. The valve chamber 132 and the exhaust path 105 are communicated with each other by the opening 134 and the communicating path 135 (shown in Japanese Patent Unexamined Publication No. Hei. 5-79325).

Accordingly, after secondary air has been introduced from an air tube 136 into the valve chamber 132, it passes through a valve 133 when the valve 133 is opened by the pulsation effect of exhaust gas. Then, the secondary air is introduced into the exhaust path 105 via the opening 134 and the communicating path 135. In the exhaust path 105, exhaust gas is subjected to re-combusting by the secondary air.

The conventional secondary air introducing structure by which secondary air is introduced into the exhaust path of the internal combustion engine is composed as described above. Accordingly, the water jackets 120, 121 are arranged between the valve 133 and the exhaust path 105. Heat of exhaust gas flowing in the exhaust path 105 is intercepted by these water jackets 120, 121. Therefore, no heat of exhaust gas is transmitted to the valve 133 side. As a result, it is possible to prevent the valve 133 from being affected by heat.

However, the following problems may be encountered in the above conventional secondary air introducing structure from which secondary air is introduced into the exhaust path of the internal combustion engine. In the above conventional secondary air introducing structure, the secondary air introducing path, which is composed of the valve chamber 132, opening 134 and communicating path 135, is formed being protruded onto the side of the cylinder section 100. Therefore, the path structure is complicated. Further, the exhaust port of secondary air, which is an opening of the communicating path 135 on the exhaust path 105 side, is distant from the exhaust valve 107. Therefore, secondary air can not be preheated to a sufficiently high temperature. Accordingly, the temperature of mixture, in which exhaust gas is mixed with secondary air, is not raised to a sufficiently high temperature. As a result, the function of a catalyst is lowered, and re-combustion of exhaust gas is not sufficiently carried out.

SUMMARY OF THE INVENTION

The present invention has been accomplished to solve the above problems caused in the conventional secondary air introducing structure from which secondary air is introduced into the exhaust path of the internal combustion engine. It is an object of the present invention to provide a secondary air introducing structure from which secondary air is introduced into the exhaust path of the internal combustion engine by which the introduced secondary air can be sufficiently preheated, so that the function of the catalyst can be prevented from deteriorating and the re-combustion property of exhaust gas can be enhanced.

To solve the above object, there is provided a structure of introducing secondary air into an exhaust path of an internal combustion engine, wherein a secondary air introducing path is formed in a cylinder head along an exhaust port.

Due to the structure described above, secondary air is effectively heated by heat retained in the exhaust gas flowing in the exhaust port. Therefore, the secondary air is heated to a sufficiently high temperature. Accordingly, it is possible to raise the temperature of mixture of exhaust gas and secondary air. Due to the foregoing, it is possible to prevent the function of the catalyst from deteriorating, and the re-combustion property of exhaust gas can be enhanced.

In addition, the secondary air is fed by an air pump with pressure, and an outlet of the secondary air introducing path is directed to an exhaust valve side. Accordingly, secondary air can be sufficiently supplied, and the introducing position of secondary air is close to the exhaust valve.

As a result, exhaust gas of high temperature and sufficiently preheated secondary air, the volume of which is sufficiently large, are mixed with each other, and the temperature of the mixture can be more raised. Therefore, the re-combustion property of exhaust gas can be more enhanced.

Further, the secondary air introducing path is formed between an exhaust port and an upper face of the cylinder head. Therefore, the secondary air introducing path can be formed without being affected by the exhaust manifold. Accordingly, the secondary air introducing path can be easily maintained and removed. Usually, the exhaust manifold are incorporated into an internal combustion engine in such a manner that it hangs from the exhaust port. However, when the secondary air introducing path and the secondary air path are provided between the exhaust manifold and the engine body, the maintenance work becomes difficult and further it becomes difficult to remove those paths.

Moreover, a water jacket may be formed between the secondary air introducing path and the upper face of the cylinder head. Therefore, even when exhaust gas of high temperature flows backward into the secondary air introducing path which is communicated with the exhaust port, an upper portion of the cylinder head is cooled by cooling water flowing in the water jacket.

As a result, it is possible to prevent the occurrence of heat deterioration of packing provided between the cylinder head and the cylinder head cover, and also it is possible to prevent the occurrence of heat deterioration of gasket provided between the secondary air path forming member, which is attached to a peripheral wall of the cylinder head, and the cylinder head. Consequently, it is unnecessary to use expensive heat-resistant material for these parts.

DETAILED DESCRIPTION OF THE PREFERRED EMBODIMENTS

An embodiment shown in FIG. 1 which is according to the present invention will be explained as follows.

Figure 1:
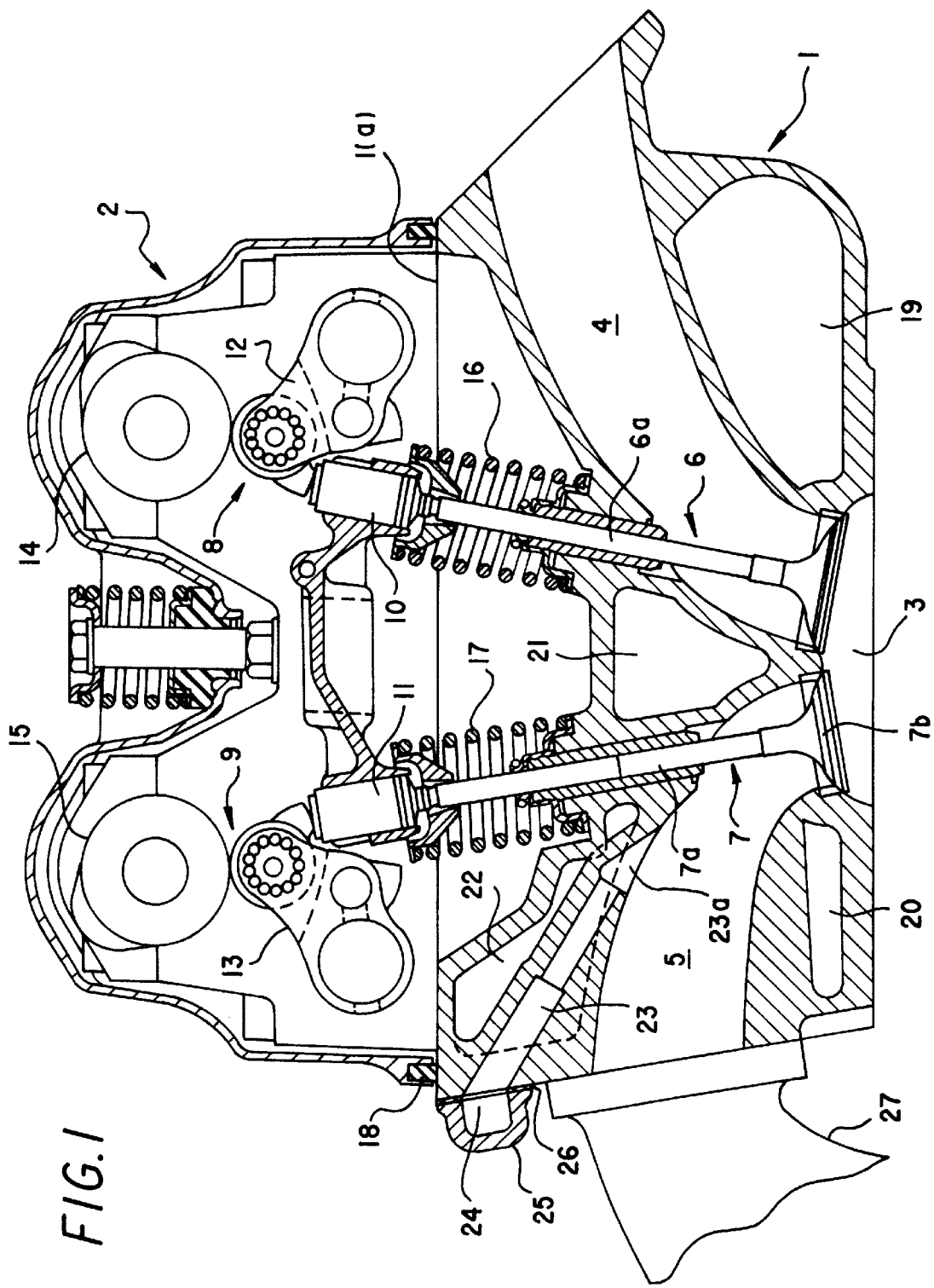
FIG. 1 is a longitudinal cross-sectional view showing an upper portion of a cylinder head of an internal combustion engine to which the structure of introducing secondary air into an exhaust path according to the present invention is applied.
Figure 2:
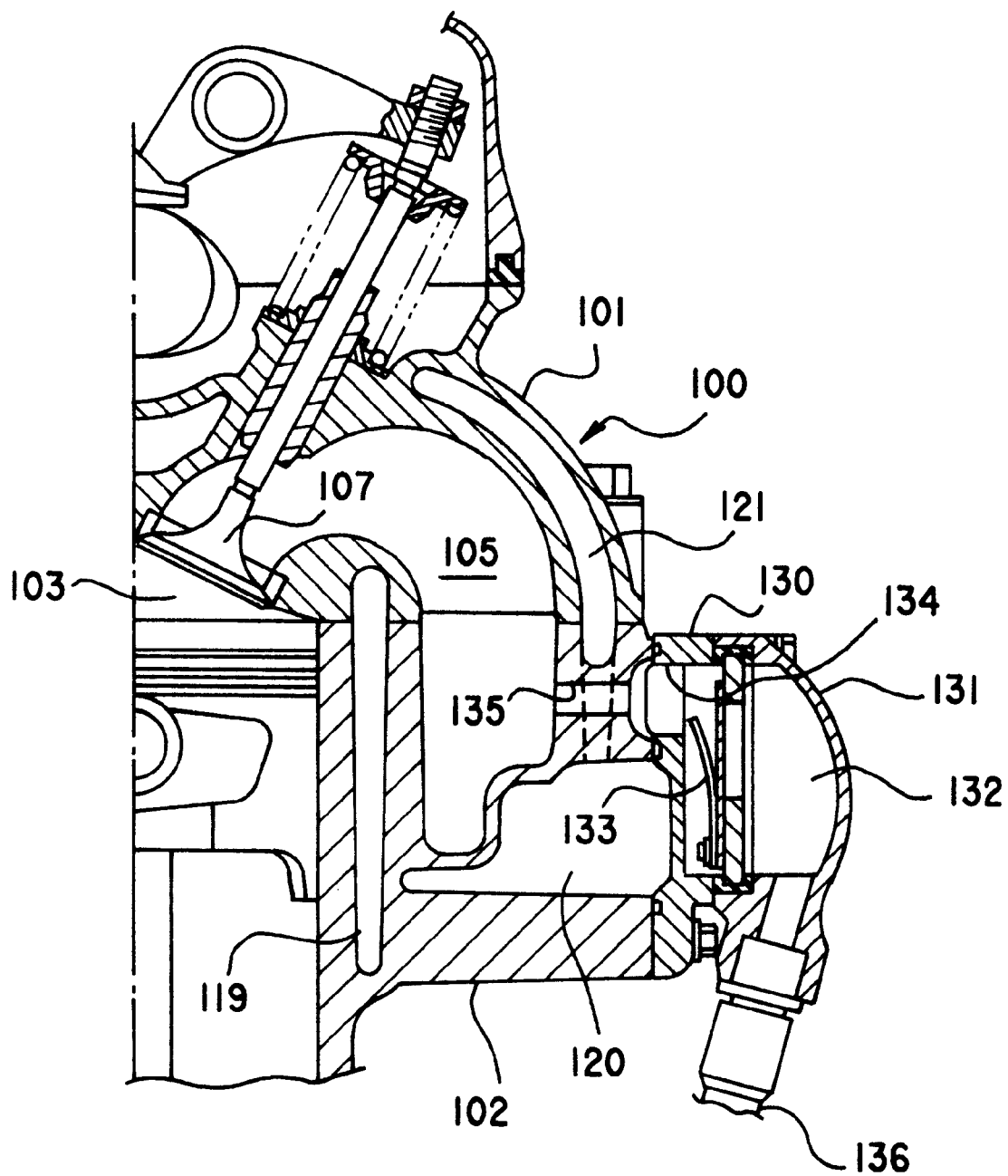
FIG. 2 is a view showing a conventional structure.

In FIG. 1, the structure of introducing secondary air into an exhaust path of this embodiment is applied to a cylinder head 1. At the lower center of this cylinder head 1, there is formed a combustion chamber top space 3, the section of which is curved. There are provided a suction port 4 and an exhaust port 5, which are connected with this combustion chamber top space 3, wherein the suction port 4 is directed to right and the exhaust port 5 is directed to left. In this connection, reference numeral 27 is an exhaust manifold connected with the exhaust port 5.

Stems 6a, 7a of the suction valve 6 and the exhaust vale 7 penetrate a ceiling wall of the cylinder head 1 and extend upward. Top portions of these stems 6a, 7a respectively come into contact with hydraulic tappets 10, 11 arranged in the suction and the exhaust side. The stems 6a, 7a are pushed and driven by valve driving mechanisms 8, 9 on the suction and the exhaust side structured by the hydraulic tappets 10, 11, rocker arms 12, 13, cam shafts 14, 15 and coil springs 16, 17. Therefore, the suction valve 6 and the exhaust valve 7 are opened and closed at predetermined time, so that suction and exhaust are alternately conducted via the suction port 4 and the exhaust port 5.

The valve driving mechanisms 8, 9 on the suction and the exhaust side are covered with a cylinder head cover 2. This cylinder head cover 2 is fixed to an upper face 1(a) of the cylinder head 1. There is intervened a packing 18 between the cylinder head cover 2 and the cylinder head 1. At appropriate portions of the cylinder head 1, there are formed water jackets 19, 20, 21, 22.

In the cylinder head 1, there is provided a secondary air introducing path 23 for introducing secondary air so that exhaust gas flowing in the exhaust path including the exhaust port 5 can be re-combusted. This secondary air introducing path 23 is formed between the exhaust port 5 and an upper face of the cylinder head 1 along the exhaust port 5. An outlet 23a of the secondary air introducing path 23 is formed in such a manner that a blowing direction of introduced air is directed to a valve body 7b of the exhaust valve 7.

Between the secondary air introducing path 23 and the upper face of the cylinder head 1, there is provided a portion of the water jacket 22 which is arranged in such a manner that it is rolled therebetween. A main body of the water jacket 22 is shown by chain lines in FIG. 1 and arranged in a direction opposite to the viewer's side in the drawing. In this connection, this portion of the water jacket 22 may be independently formed.

Secondary air is fed with pressure by an air pump from an air cleaner (not shown). Thus fed secondary air passes through a secondary air path 24 formed on a peripheral wall of the cylinder head 1 and flows into the secondary air introducing path 23. The secondary air path 24 is formed in such a manner that a path forming member 25 made of metal, the section of which is a U-shape, is fixed to the peripheral wall of the cylinder head 1. Between the path forming member 25 and the peripheral wall of the cylinder head 1, there is intervened a gasket 26.

Due to the above construction, this embodiment can provide the following effects.

Secondary air introduced from the secondary air introducing path 23 is effectively heated by heat retained in the exhaust gas flowing in the exhaust port 5, that is, secondary air introduced from the secondary air introducing path 23 is sufficiently preheated, so that the temperature can be raised. Therefore, mixture of the exhaust gas and secondary air can be heated to a sufficiently high temperature. Due to the foregoing, the function of the catalyst can be prevented from deteriorating, and the re-combustion property of exhaust gas can be enhanced. Therefore, it becomes possible to remarkably reduce HC and CO in the exhaust gas.

Since secondary air is fed with pressure by the air pump and the outlet 23a of the secondary air introducing path 23 is directed to the valve body 7b of the exhaust valve 7, secondary air can be sufficiently fed and the introducing position of secondary air is located close to the exhaust valve 7.

As a result, exhaust gas of high temperature and fully preheated secondary air, the volume of which is sufficient, are mixed with each other. Therefore, the temperature of the mixture can be more raised, and the re-combustion property of exhaust gas can be more enhanced.

The secondary air introducing path 23 is formed between the exhaust port 5 and the upper face of the cylinder head 1. Therefore, the secondary air introducing path 23 can be arranged without being affected by the exhaust manifold 27. Due to the foregoing, the secondary air introducing path 23 can be easily maintained and removed. Usually, the exhaust manifold 27 are incorporated into an internal combustion engine in such a manner that it hangs from the exhaust port 5 (shown in FIG. 1). However, when the secondary air introducing path 23 and the secondary air path 24 are provided between the exhaust manifold 27 and the engine body, the maintenance work becomes difficult and further it becomes difficult to remove those paths.

Further, a portion of the water jacket 22 is arranged between the secondary air introducing path 23 and the upper face of the cylinder head 1 in such a manner that the portion of the water jacket 22 is rolled therebetween. Therefore, even when exhaust gas of high temperature flows backward into the secondary air introducing path 23 which is communicated with the exhaust port 5, an upper portion of the cylinder head 1 is cooled by cooling water in the water jacket 22.

As a result, it is possible to prevent the occurrence of heat deterioration of the packing 18 provided between the cylinder head 1 and the cylinder head cover 2, and also it is possible to prevent the occurrence of thermal deterioration of the gasket 26 provided between the secondary air path forming member 25 and the cylinder head 1. Consequently, it is unnecessary to use expensive heat-resistant material for these parts.

Moreover, since the secondary air introducing path 23 is provided above the exhaust manifold 27, due to heat of the exhaust manifold 27, the secondary air is sufficiently preheated and the temperature can be raised.

In this embodiment, the secondary air introducing path 23 is formed along the exhaust port 5 between the exhaust port 5 and the upper face of the cylinder head 1, however, the present invention is not limited to the above specific embodiment. The secondary air introducing path 23 may be formed along the exhaust port 5 between the exhaust port 5 and a lower portion of the cylinder head 1. In this case, a water jacket of a relatively large capacity is formed in the usual manner between the exhaust port 5 and the upper portion of the cylinder head 1.

While only certain embodiments of the invention have been specifically described herein, it will apparent that numerous modifications may be made thereto without departing from the spirit and scope of the invention.

The present disclosure relates to the subject matter contained in Japanese patent application No. Hei. 10-248837 filed on Sep. 2, 1999 which is expressly incorporated herein by reference in its entirety.

What is claimed is:

1. A structure for introducing secondary air into an exhaust path of an internal combustion engine, comprising a secondary air introducing path formed along a water jacket in a cylinder head and extending entirely between said exhaust path and an upper face of said cylinder head, wherein an outlet of said secondary air introducing path is formed to direct to a combustion-chamber-side tip portion of an exhaust valve, and wherein said secondary air introducing path is located in an exhaust manifold side with respect to said exhaust valve, wherein said secondary air introducing path is directed to a peripheral wall of said cylinder head, wherein said secondary air introducing path is formed with a path forming member attached to the peripheral wall of said cylinder head, and wherein a gasket is intervened between said path forming member and an exhaust manifold attaching surface of said cylinder head.

2. The structure for introducing secondary air into an exhaust path of an internal combustion engine according to claim 1, wherein a water jacket is formed between said secondary air introducing path and the upper face of said cylinder head.

3. The structure for introducing secondary air into an exhaust path of an internal combustion engine according to claim 1, wherein said secondary air introducing path is formed by attaching a path forming member to a peripheral wall of said cylinder head, and wherein said path forming member is made of metal and has a U-shape cross-section.

\* \* \* \* \*